United States Patent
Krishnan et al.

(10) Patent No.: US 6,765,040 B2
(45) Date of Patent: Jul. 20, 2004

(54) PUBLICATION GRAVURE PRINTING INKS BASED ON SILICONE MODIFIED WATER-BASED EMULSIONS

(75) Inventors: Ramasamy Krishnan, Colonia, NJ (US); Robert Catena, Belleville, NJ (US); Selcuk Avci, Clifton, NJ (US)

(73) Assignee: Sun Chemical Corporation, Fort Lee, NJ (US)

( * ) Notice: Subject to any disclaimer, the term of this patent is extended or adjusted under 35 U.S.C. 154(b) by 161 days.

(21) Appl. No.: 10/026,003

(22) Filed: Oct. 25, 2001

(65) Prior Publication Data

US 2003/0130376 A1 Jul. 10, 2003

(51) Int. Cl.[7] .................. C09D 11/10; C08L 33/14; C08L 33/02; C08K 5/5415; C08K 5/5419
(52) U.S. Cl. .................. 523/160; 524/558; 524/556; 524/265
(58) Field of Search ................. 523/160, 161; 524/558, 556, 577, 261, 265, 266; 106/31.6

(56) References Cited

U.S. PATENT DOCUMENTS

| | | | | |
|---|---|---|---|---|
| 4,404,318 A | * | 9/1983 | Higuchi et al. | 524/588 |
| 5,068,277 A | | 11/1991 | Vukov et al. | 524/441 |
| 5,098,478 A | | 3/1992 | Krishnan et al. | 106/23 |
| 5,238,726 A | | 8/1993 | Ide et al. | 428/195 |
| 5,538,577 A | | 7/1996 | Negoro | 156/235 |
| 5,719,206 A | * | 2/1998 | Mihoya et al. | 523/212 |
| 5,972,088 A | | 10/1999 | Krishnan et al. | 106/31.73 |
| 6,072,008 A | * | 6/2000 | Matsuno et al. | 525/330.3 |

FOREIGN PATENT DOCUMENTS

GB    2212163 A  *  7/1989

* cited by examiner

*Primary Examiner*—Callie Shosho
(74) *Attorney, Agent, or Firm*—Sidney Persley

(57) ABSTRACT

The present invention relates an improved silicone modified water-based emulsion used primarily for publication gravure ink. Publication gravure water-based ink produced with the new polymer exhibits superior paper holdout, smoother lay, and higher gloss on super calendered and uncoated paper substrates as compared to conventional water-based gravure inks.

14 Claims, No Drawings

PUBLICATION GRAVURE PRINTING INKS BASED ON SILICONE MODIFIED WATER-BASED EMULSIONS

CROSS-REFERENCE TO RELATED APPLICATIONS

Not applicable.

STATEMENTS REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

This invention relates to inks having silicone-containing water-based polymers as additives therein.

2. Description of the Related Art

Gravure is a major commercial printing process that can be used to print, on a substrate such as paper, anything from newspaper to fine art. Text and images can be printed.

Gravure is an intaglio process wherein ink is transferred to the paper as drops from very small cells that are recessed into a printing surface, e.g., a cylinder or flat plate. Web fed and high speed decorating systems are better known as Rotogravure. This is a high speed process used for large print runs. In the gravure printing process the printing area is actualy etched into the surface of a plate or metal cylinder. The etched out sections are "filled" with ink, the excess ink in the non-image area is removed with a thin stainless steel blade (doctor blade). The size and depth of the etched out areas determine how much ink is deposited on the substrate. The ink drops flow and selectively spread together to print the text or image. If the surface tension of the ink drop is too high, the ink will not spread quickly or far enough causing the print to appear rough and grainy.

Gravure inks are very fluid, solvent or co-solvent based inks that dry by evaporation to leave a film of resin and pigment on the substrate. Representative solvents and co-solvents include toluene, xylene, alcohols, acetone, aliphatic hydrocarbons, water and the like. Except for water, the solvents and co-solvents are volatile organic compounds (VOC). Due to environmental considerations, limitations are being placed on the amount of VOC emissions that occur during printing. Solvent recovery systems or incinerators, utilized to reduce the VOC emissions, treat the effect rather than the cause of the VOC problem.

Safety and environmental considerations are forcing changes in printing ink formulations. Solvent-based printing inks are now regarded as being undesirable from several points of view. This is particularly true for publication gravure printing inks that are generally based on toluene or mixtures of toluene and aliphatic hydrocarbons. Such solvents are hazardous (explosions at publication gravure printing plants have occurred) and require expensive solvent recovery units to limit air effluents (toluene and toluene/aliphatic hydrocarbon mixtures are very volatile, particularly at the temperature and air flow conditions normally present in printing press driers).

The need to reduce volatile organic compound (VOC) emission during Gravure and/or Rotogravure printing has lead to the development of various water-based gravure ink compositions, as described for example in U.S. Pat. Nos. 5,098,478 and 5,972,088. The problems in developing a water-base gravure ink composition as replacements for solvent-based gravure inks that emit VOC are well documented by the above identified patents, which are hereby incorporated by reference. Water-based inks have proven to be prone to printability problems, especially for publication gravure. Examples of such printability problems include poor transfer from the gravure cells and spreading behavior on paper. These printability problems typically manifest themselves as skipped dots in the tone areas and a generally "wormy" appearance and nonuniformity in the solids.

Water-based gravure printing processes have also been developed to avoid the environmental impact and operating expenses associated with the use of solvents. The solvent used in gravure ink is a temporary ingredient, present purely as a means of applying the vehicle solids to the substrate by way of the printing unit. A gravure ink must remain fluid during the printing process while the ink flows from the gravure cells onto the substrate. The solvent is then rapidly removed within the drying cycle. Hence, the evaporation rate of the solvent must be geared to the length of time required to remove the excess ink by the doctor blade and the elimination point of the solvent. This time span is clearly governed by press speed. In recent years, changes made to reduce the maximum concentration of solvent vapors allowable in the pressroom atmosphere have resulted in the virtual elimination of solvents such as 2-ethyloxyethanol and the corresponding acetate. These have been replaced with glycol ethers and esters and solvents based on propylene glycol. The press handling characteristics of these water-base inks are uniquely different from organic solvent base materials. Once dry, aqueous based inks may be reluctant to redissolve in water, depending upon the kind of resin system used in the ink. This could result in an increase in cylinder plugging and number of press wash-ups. Conversely, the resin system may not be sufficiently water resistant upon drying causing the ink to be easily smeared in the presence of moisture. The resin system used in water-based inks can give rise to poor dot spread and increased skipped dots. These problems have been difficult to overcome given the limited availability of resins for use in water-based systems. Water-based systems are not as readily resolubilized as solvent systems. It is therefore possible that any precipitation will not be resolubilized within the next revolution of the cylinder in the ink duct. Therefore, unless carefully controlled, fluctuations in pH can lead to packing in the etch of the gravure cylinder and ultimately to screening.

The surface tension characteristics of the water-based system must also be considered since generally they are totally different from those of solvent systems. These differences can lead to poor substrate wetting which results in ink reticulation, crawling, and non-uniform ink flow from the cells. Surface tension can be reduced, however, by careful selection of surface active agents.

In addition to the environmental concerns, ink applications have to meet several stringent requirements. For example, the ink has to have good thermal stability. The ink has to have good film forming property in order to have good smear resistance. The viscosity of the ink has to be in the right range. Other properties such as surface tension, drying rate, color density, smooth lay, high gloss and paper holdout are also very important.

For a water-based gravure ink to be considered as a suitable replacement for a solvent-based gravure ink, it must generally perform comparably to a solvent-based gravure ink in terms of various factors, such as those mentioned above. Albeit that the achievement of comparable performance of a water-based gravure ink compared to that of a solvent-based gravure ink is difficult enough, it also remains a desire in this art to find water-based gravure ink compositions that exhibit even superior performance to water-based gravure ink compositions that heretofore have been developed as suitable replacements for solvent-based gravure ink compositions.

A gravure ink may be broadly regarded as composed of four major components, namely: (1) the pigment or pigments (the colored medium that causes the print pattern); (2) a liquid vehicle that carries the pigment(s); (3) optionally, an extender (that allows for reduction in the quantity of pigment needed to achieve the desired quality of print pattern); and (4) various additives each optionally included for the achievement of a particular results (e.g., surfactants, defoaming agents, catalysts, antioxidants, corrosion inhibitors, biocides, deodorants). Primary among the concerns about the operation of a gravure printing ink are its operational/final properties of printability (clean, sharp transfer without "stringing or misting"), holdout, and final gloss.

True water-based gravure inks, i.e., inks that only use water as a solvent and do not include a co-solvent, provide a poorer print quality. The printed paper is roughened because the ink wets and swells the paper fibers. The print is rough and grainy because of the roughening and also because the chemical formulation of the ink results in poor ink transfer to the paper, poor ink dot spreading on the paper and poor trapping, i.e., over printing, of one ink on another. Thus, the printability is generally poorer.

It is an object of this invention is to provide a water-based gravure ink suitable for use in a gravure printing process and compatible with a wide variety of substrates. Another object of this invention is to provide a water-based gravure ink which retains the performance characteristics of conventional solvent-based ink formulations and is compatible with the standard pigments and resin systems used in gravure printing. A further object of this invention is to provide a more economical water-based gravure ink from a raw material and emission control cost standpoint. Such objectives have been achieved by means of the present invention.

BRIEF SUMMARY OF THE INVENTION

This invention constitutes the discovery of a water-based ink composition that is suitable for use in a gravure printing process that exhibits superior paper holdout, smoother lay, and higher gloss on super calendered and uncoated paper substrates as compared to conventional water-based gravure inks. This invention relates to silicone-modified water-based emulsions which may be used to produce a publication gravure water-based ink of superior properties.

The water-based ink composition that is superior for use in a gravure printing process employs in its liquid vehicle carrier for the pigment(s) thereof a silicone modified resin that is in the form of an aqueous emulsion. The silicone modified resin in its most general terms constitutes the reaction product resulting between the reaction of a alkoxysilane reagent and an emulsion polymer containing hydroxy functional groups as heretofore has been used in unmodified form for the formulation of water-based inks intended for use in gravure printing processes.

A form of alkoxysilane, marketed by DOW CORNING® as "QP8-5314 Intermediate," had heretofore been available for use as a coating for emulsion acrylic polymers in order to improve the outdoor weatherability of such emulsion acrylic polymers to improve the chalk resistance and color and gloss retention of such acrylic polymers under outdoor weatherability conditions.

Considering, in the context of a gravure ink composition, that silicone additives/polymers have been observed to behave as surfactants and/or defoamers that may cause printing problems, it was surprising to discover that the employment of a silicon-modified acrylic polymer emulsion as a liquid vehicle component for a water-based ink composition intended for a gravure printing process yielded a water-base ink of superior printability in comparison to a comparable gravure ink composition using an unmodified acrylic polymer emulsion as a component for its liquid vehicle carrier. Also, surprising to observe, was that a water-based ink composition using in its liquid vehicle carrier the silicone-modified acrylic polymer emulsion also provide superior holdout and gloss performance/results when employed in a gravure printing process.

DETAILED DESCRIPTION OF THE INVENTION

The present invention comprises an improved silicone modified water-based emulsion polymer binder for use in the production of ink compositions. The silicone modified water-based emulsion polymer binder is used to produce a publication grade gravure water-based ink that exhibits superior paper holdout, smoother lay, and higher gloss on super calendered and uncoated paper substrates as compared to conventional water-based gravure inks.

As before described, a gravure printing process is one wherein the printing area is actually etched into the surface of a plate or metal cylinder. The etched out sections are "filled" with ink, the excess ink in the non-image area is removed with a thin stainless steel blade (doctor blade). The size and depth of the etched out areas determine how much ink is deposited on the substrate. And as heretofore noted, this invention comprises the discovery of water-based ink compositions that are suited to and provide superior performance when used in a gravure printing process. Further, this invention comprises the discovery of an improvement to the process of gravure printing with a water-based ink. That improvement being that use in such process of a water-based ink the liquid vehicle component of which contains a silicone-modified polymer aqueous emulsion, such as a silicone-modified acrylic polymer aqueous emulsion, provides for enhanced printability and/or holdout and/or gloss of the so printed pattern.

In a broad sense, the gravure printing ink composition of the present invention is made up of a pigment and a vehicle. The vehicle is a liquid carrier, which may be an emulsion. In the present invention the vehicle is water and/or an aqueous emulsion which replaces the volatile organic compound vehicle thereby eliminating volatile organic compound (VOC) emissions. The vehicle also contains a "silicone modified binder resin" which adheres the pigment to the substrate being printed. It has been surprisingly found that the performance of the gravure printing ink of this invention is superior in terms of its printability, hold-out and gloss as compared to an otherwise identical gravure printing ink composition the binder resin of which is not silicone modified. The water-based gravure ink of the present invention may optionally contain other conventional additives, such as extenders, rewetting agents, plasticizers, waxes, surfactants, defoaming agents, catalysts, antioxidants, corrosion inhibitors, biocides, deodorants, and the like.

Embodiments of the ink composition of the invention will typically contain about 20–60 wt. %, preferably 25–50 wt. %, water and about 2–45 wt. %, preferably 10–45 wt. %, of a pigment. The pigment may be any of those typically found in solvent-based publication gravure inks such as carbon black, phthalocyanine blue, phthalocyanine green, diarylide yellows, lithol rubine, red lake C, barium lithol, and the like.

As in all colored gravure inks, the pigment is the most expensive part of the formulation. The economics of pigment selection is vitally important. In many areas of gravure printing, pigments need specific properties to meet the demands made on them during the printing process and in the end use of the printed material, e.g. printing of polyvinyl chloride wallcoverings, deep-freeze polyethylene bags. The normal practice is to have a preferred standard range of pigments against which alternatives can be assessed. In addition, consideration should be given to the pigment's tinctorial strength, ease of dispersion and gloss characteristics. Where it is envisaged that the pigment will be used in a concentrated base scheme, it must have good flow properties at high pigmentation.

Examples of pigments suitable for formulating the gravure ink of the present invention are CI Pigment Yellows 1, 3, 4, 5, 12, 13, 14, 17, 55, 65, 73, 83, 97 and 98; CI Pigment Oranges 13, 16 and 46; CI Pigment Reds 2, 3, 4, 10, 12, 48, 48:1, 48:2, 53, 57:2, 81, 104, 146, 170 and 176; CI Pigment Greens 2, 7 and 36; CI Pigment Blues 1, 15:1, 15:2, 15:3, 15:6, 16, 29, 56 and 61; CI Pigment Violets 3, 23 and 37; CI Pigment Blacks 6 and 7; and CI Pigment Whites 6, 7, 18 and 26.

About 20–70 wt. %, preferably about 35–65 wt. % of one or more aqueous emulsion polymers, i.e. aqueous addition polymers such as acrylic emulsion polymers, which are silicone modified are made part of the liquid carrier. Such polymers in their unmodified form are well known in the prior art and are prepared from monomers such as acrylic or methacrylic acid esters of polyhydric alcohols acrylic acid or methacrylic acid esters, methyl methacrylate, vinyl acetate, and the like and may contain comonomers such as styrene and the like. Such emulsion polymer should be silicone modified by reacting it with a

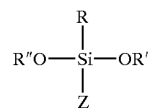

alkoxysilane reagent of the following formula;

wherein R is a cycloalkyl or an aryl group of 6 to 12 carbon atoms, R' and R" are each independently an alkyl group of from 1 to 10 carbon atoms, and Z is an alkyl or alkoxy group of 1 to 10 carbon atoms. Preferably R is phenyl, R' and R" are methyl or ethyl and most preferably both are methyl, and Z is a methyl or a methoxy group. A preferred alkoxypilane reagent is available from Dow Corning as "QP8-5314 Intermediate" and composes>60 wt % phenyltrimethoxysilane and 15–40 wt % phenylmethyl dimethoxysilane. Typically, the silicone modified emulsion polymer comprises a total non-volatile content of about 40–50 wt %, preferably about 45 wt %, with the balance being water.

Suitable examples of the macromolecular resin binders comprising aqueous emulsions include acrylic or vinyl emulsion polymers prepared from monomers selected from the group consisting of acrylic acid esters, methacrylic acid esters, acrylic acid esters of polyhydric alcohols, methyl methacrylate, and vinyl acetate. Preferably the macromolecular resin binder is an styrene/acrylic polymer emulsion, such as Lucidene 395 from Morton. The macromolecular resin binder emulsion polymer is reacted at ambient temperature with the alkoxysilane reagent under agitation sufficient to insure that the alkoxysilane is mixed into the latex emulsion without floating on the surface. On a solids basis about one part of the alkoxysilane is mixed with from 2 to 5 parts of macromolecular resin binder emulsion polymer, and preferably this ratio is about one part of alkoxysilane to 2.5 to 3.5 parts of macromolecular resin binder emulsion polymer. It is believed that the alkoxysilane under goes emulsion polymerization and deposits a silicone resin on the emulsion polymer particles of the macromolecular resin binder. The silicone resin so deposited is primarily silanol functional with some original alkoxy functionality retained. It is this reaction product that is herein referred to as a silicone modified macromolecular resin binder.

In the gravure ink formulations of the present invention the water is preferably present in an amount of 20 to 60 wt. % of the ink; and more preferably 20 to 30 wt. %. It is also preferred that the aqueous emulsion of the silicone modified macromolecular resin binder be present in an amount of 10 to 70 wt. % and the water content of this emulsion counts as part of the water content of the ink; and more preferably 30 to 65 wt. %; and most preferably the silicone modified macromolecular resin binder is a composite having up to 5 wt. % of a resin binder soluble in water regardless of the pH of the water; and 10 to 70 wt. % of a resin binder soluble in water at a pH ranging from 7.5 to 10. At press viscosity, the maximum pigmentation for organic pigments typically does not exceed 25 wt. %, more preferably 5–10 wt. % of pigment is used. However, with inorganic pigments such as titanium dioxide, pigment levels as high as 25–35 wt. % are used. Therefore, the pigment is preferably present in an amount of about 2 to 35 wt. %

As a secondary resin in addition to that of the silicon modified macromolecular resin binder the following resins and mixtures may also be incorporated into the gravure ink of the present invention as desired: rosin and modified rosins, such as calcium, magnesium and zinc metallic resinates; ester gum of rosin; maleic resins and esters; dimerized and polymerized rosins; rosin modified fumaric resins; shellac; asphalts; phenolic resins and rosin-modified phenolic resins; alkyd resins; polystyrene resins and copolymers thereof; terpene alkylated urea formaldehyde resins; alkylated urea formaldehyde resins; polyamide vinyl resins, such as polyurethane resins; polyimide resins; polyvinyl acetate and polyvinyl alcohol; ketone resins; acrylic resins, such as polyacrylic acid and polymethacrylic acid; epoxide resins; polyurethane resins; cellulosic resins, such as nitro- and ethyl-cellulose, ethyl cellulose, cellulose acetate butyrate and carboxymethyl cellulose.

The secondary resin may be soluble or dispersible in either the water or aqueous emulsion, depending on the resins hydrophobic/hydrophilic character. In a preferred embodiment, the resin is soluble in the water. The resin binder may be emulsified by mechanical energy being imparted by, for example, pumping the components together in the ink reservoir of a standard gravure printing press. Emulsifiers, such as surfactants, may be added to increase the stability of the emulsion. Generally, the emulsion will remain stable during printing by circulation of the ink in the printing well.

Examples of suitable secondary resin binders which are soluble in the water regardless of the pH of the water include: carboxymethyl-cellulose, hydroxyethylcellulose, hydroxypropyl-cellulose, hydroxybutylmethylcellulose, poly ($C_1$–$C_4$) alkylene oxides, polyethyleneimine, polyvinyl alcohol, polyvinyl acetate, polyvinylpyrollidone, polyvinyloxazolidone and polyacrylamide polymers.

Preferably, the macromolecular resin rosin salt binders present in the ink are only those which are soluble in the water at pH value ranging from about 7.5 to about 10 and more preferably from about 2.5 to about 6.5 pH. Suitable examples of such binders include methacrylic resin rosin salts; styrene-acrylic resin rosin salts; resin rosin salts; and polystyrene-sulfonic acid resin rosin salts.

Optionally, extenders such as china clay and precipitated calcium carbonate may be used in the gravure ink formulations of the present invention. Extenders help control gloss levels and improve the lay characteristics in ink formulations having high binder/pigment ratios. Due to their low cost, extenders can be used to effectively cheapen the cost of gravure inks. For example, extenders can be used in publication gravure inks to assist tack reduction and control color strength.

Rewetting agents are also employed in the present gravure ink formulation to reduce screening which occurs when the ink in a cell of a second color combines with the dried ink of a first color. To off-set the effects of screening, a rewetting agent is employed. The rewetting agent suitable for use in the present invention is hydroxyethyl ethylene urea. While not wishing to be bound by theory, it is believed that the hydroxyethyl ethylene urea rewetting agent also serves as a plasticizer by providing surface continuity to the dry film on the substrate.

The water-based gravure ink of the present invention may optionally contain other conventional additives, the effects of which must be evaluated, and if necessary, compensated for in the printing process. These adjuvants will include plasticizers such as sucrose acetate iso-butyrate, triethyl citrate, and epoxidised soy bean oil, and waxes such as polyethylene waxes, halogenated hydrocarbon waxes, fatty acid amides, surfactants, defoaming agents, catalysts, antioxidants, corrosion inhibitors, biocides and deodorants. Ammonia or other volatile amines may also be added in trace amounts to aid in dissolving the resin.

The viscosity requirements of gravure inks dramatically distinguish them from paste-like inks, such as lithographic inks. Ink viscosity must be adjusted to meet several critical factors. Too high a viscosity results in an inadequate flow of ink from the cells of the cylinder and causes a phenomenon commonly known as "screening." Too low a viscosity results in a "slur-out" or "halo" occurring on the trailing edge of the print, appearing as a thin film of ink printing beyond the limits of the design. With this in mind, the final strength and shade adjustments to a gravure ink should be made when the proper viscosity and printing speed have been determined. The viscosity of the gravure ink of the present invention will fall between 14 and 90 seconds at 25° C. (measured using a Shell Cup #2) and more preferably is between 16 and 50 seconds at 25° C. The present gravure inks can, however, be used at temperatures of up to 75° C. in this viscosity range.

The following example further illustrates specific aspects of the water-based gravure ink of the present invention and is not intended to limit the scope thereof in any respect and should not be so construed. Throughout this specification, all parts and percentages shown, unless otherwise noted, are by weight.

EXAMPLES

To a 5 liter 4-neck flask equipped with a nitrogen inlet adapter, thermometer, mechanical agitator, and condenser, were charged 73.5 parts Lucidene 395 (45% total non volatiles (TNV) sytrene/acrylic polymer aqueous emulsion from Morton) and 16.6 parts deionized water. Agitation at ambient temperature was conducted at such speed that a vortex formed that extended halfway down the stirring rod. After a 30 minutes hold, 9.9 parts of Dow Corning silicone intermediate QP8-5314 was added slowly over a 1 hour period, ensuring that the intermediate mixed into the latex without floating on the surface. When addition was complete agitation was maintained for 2 hours. The product of reaction was the discharged. Final properties of this silicone modified acrylic emulsion were: 43% TNV; pH 8.5–9.0; Brookfield viscosity @ room temperature 50–100 cps.

A water-based gravure ink was prepared from the following components:

| EXAMPLE 1 - RED INK | |
|---|---|
| | Parts |
| Red Dispersion (blue shade) | 35.70 |
| Red Dispersion (yellow shade) | 5.00 |
| Water | 7.00 |
| Polyester Varnish | 10.00 |

EXAMPLE 1 - RED INK

| | Parts |
|---|---|
| Silicone Modified Acrylic Emulsion | 30.00 |
| Surfynol 420 (suffactant - Air Products) | 3.00 |
| Proxel GXL (biocide - ICI) | 0.20 |
| NATD (disodium 2,5-dimercapto-1,3,4-thiadiazole-Vanderbilt-Rust Preventer) | 0.20 |
| Calcium Carbonate Base | 6.00 |
| Water | 2.90 |
| | 100.00 |

EXAMPLE 2 - COMPARATIVE

| | Parts |
|---|---|
| Red Dispersion (blue shade) | 35.70 |
| Red Dispersion (yellow shade) | 5.00 |
| Water | 7.00 |
| Polyester Varnish | 10.00 |
| Lucidene 395 | 30.00 |
| Surfynol 420 (surfactant - Air Products) | 3.00 |
| Proxel GXL (biocide - ICI) | 0.20 |
| NATD (disodium 2,5-dimercapto-1,3,4-thiadiazole-Vanderbilt-Rust Preventer) | 0.20 |
| Calcium Carbonate Base | 6.00 |
| Water | 2.90 |
| | 100.00 |

TABLE I

Comparison of Ink Properties with/without Silicone Modification

| Property | Example 1 | Example 2 |
|---|---|---|
| Zahn #2 Viscosity (virgin viscosity) | 17" | 21" |
| Dilution Ratio (Shell #2–20") | 21/100 | 23/100 |
| Printability | Excellent | Fair |
| Holdout | Excellent | Good |
| Gloss | Higher than STD | STD |

These inks were evaluated on the Huck Press. The substrate used was uncoated paper.

EXAMPLE 3 - YELLOW INK

| | Parts |
|---|---|
| Yellow Dispersion (Yellow 12) | 22.00 |
| Red Dispersion (Lithol Rubine Red) | 0.10 |
| Polyester Varnish | 10.00 |
| Siliconized Acrylic Emulsion | 63.10 |
| Defoamer Compound | 1.40 |
| NATD | 0.20 |
| Proxel GXL | 0.20 |
| Calcium Carbonate Base | 3.00 |
| | 100.00 |

EXAMPLE 4 - COMPARATIVE

| | Parts |
|---|---|
| Yellow Dispersion (Yellow 12) | 22.00 |
| Red Dispersion (Lithol Rubine Red) | 0.10 |
| Polyester Varnish | 10.00 |
| Lucidene 395 | 63.10 |
| Defoamer Compound | 1.40 |
| NATD | 0.20 |
| Proxel GXL | 0.20 |
| Calcium Carbonate Base | 3.00 |
| | 100.00 |

TABLE II

Comparison of Ink Properties with/without Silicone Modification

| Property | Example 3 | Example 4 |
|---|---|---|
| Zahn #2 Viscosity (virgin viscosity) | 18" | 19" |
| Dilution Ratio (Shell #2–20") | 20/100 | 20/100 |
| Printability | Excellent | Good |
| Holdout | Excellent | Good |
| Gloss | Higher than STD | STD |

The yellow inks were evaluated on the laboratory Huck Press and trapped with other colors (red/blue) for printability and laydown. Excellent laydown and paper holdout properties were observed for Example 3.

EXAMPLE 5 - BLUE INK

| | Parts |
|---|---|
| Blue Dispersion (Phthalo Blue) | 17.00 |
| Alkali Blue Dispersion (toner) | 2.50 |
| Polyester Varnish | 10.00 |
| Siliconized Acrylic Emulsion | 64.00 |
| Surfactant | 3.00 |
| Calcium Carbonate Base | 2.00 |
| NATD | 0.20 |
| Proxel GXL | 0.20 |
| Water | 1.00 |
| | 100.00 |

EXAMPLE 6 - COMPARATIVE

| | Parts |
|---|---|
| Blue Dispersion (Phthalo Blue) | 17.00 |
| Alkali Blue Dispersion (toner) | 2.50 |
| Polyester Varnish | 10.00 |
| Lucidene 395 | 64.00 |
| Surfactant | 3.00 |
| Calcium Carbonate Base | 2.00 |
| NATD | 0.20 |
| Proxel GXL | 0.20 |
| Water | 1.00 |
| | 100.00 |

TABLE III

Comparison of Ink Properties with/without Silicone Modification

| Property | Example 5 | Example 6 |
|---|---|---|
| Zahn #2 Viscosity (virgin viscosity) | 18.3" | 19" |
| Dilution Ratio (Shell #2–20") | 20/100 | 22/100 |
| Printability | Excellent | Good |
| Holdout | Excellent | Good |
| Gloss | Higher than STD | STD |

The blue inks were evaluated on the Huck Press. The experimental blue inks exhibited superior printability (laydown, paper holdout, gloss) compared to the standard.

The present invention has been described in detail, including the preferred embodiments thereof. However, it will be appreciated that those skilled in the art, upon consideration of the present disclosure, may make modifications and/or improvements on the invention that fall within the scope and spirit of this invention as set forth in the following claims.

We claim:

1. A water-based gravure printing ink comprising:

(a) an aqueous emulsion of a silicone modified macromolecular resin binder that comprises the reaction product of an alkoxysilane and an aqueous emulsion polymer containing hydroxy functional groups, and (b) pigment.

2. The ink of claim 1 wherein water is present in an amount of from 20–60 wt. % based on the weight of the ink.

3. The ink of claim 1 wherein the aqueous emulsion of the silicone modified macromolecular resin binder is present in an amount of from 20–70 wt. % based on the weight of the ink.

4. The ink of claim 1 wherein the macromolecular resin of the silicone modified macromolecular resin binder is selected from the group consisting of acrylic emulsion polymers prepared from monomers selected from the group consisting of acrylic acid esters, methacrylic acid esters, acrylic acid esters of polyhydric alcohols, methyl methacrylate, and vinyl acetate.

5. The ink of claim 4 wherein the aqueous emulsion of the silicone modified macromolecular resin is present in an amount of from 35–65 wt. % based on the weight of the ink.

6. The ink of claim 5 wherein the pigment is present in an amount of from 2–45 wt. % based on the weight of the ink.

7. The ink of claim 1 wherein the macromolecular resin of the silicone modified macromolecular resin binder is a styrene/acrylic polymer and the alkoxysilane with which it is reacted is of the following formula:

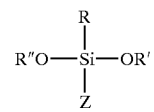

wherein R is a cycloalkyl or an aryl group of 6 to 12 carbon atoms, R' and R" are each independently an alkyl group of from 1 to 10 carbon atoms, and Z is an alkyl or alkoxy group of 1 to 10 carbon atoms.

8. The ink of claim 7 wherein R is a phenyl group, R' and R" are each methyl groups, and Z is a methyl or methoxy group.

9. In a gravure printing process which uses a water-based ink, the improvement which comprises using as the water-based ink a composition comprising:

(a) An aqueous emulsion of a silicone modified macromolecular resin binder that comprises the reaction product of an alkoxysilane and an aqueous emulsion polymer containing hydroxy functional groups, and (b) pigment.

10. The process of claim 9 wherein water is present in the ink in an amount of from 20–60 wt. % based on the weight of the ink.

11. The process of claim 10 wherein the aqueous emulsion of the silicone modified macromolecular resin binder is present in the ink in an amount of from 20–70 wt. % based on the weight of the ink.

12. The process of claim 11 wherein the macromolecular resin of the silicone modified macromolecular resin binder for the ink is selected from the group consisting of acrylic emulsion polymers prepared from monomers selected from the group consisting of acrylic acid esters, methacrylic acid esters, acrylic acid esters of polyhydric alcohols, methyl methacrylate, and vinyl acetate.

13. The process of claim 9 wherein the macromolecular resin of the silicone modified macromolecular resin binder for the ink is a styrene/acrylic polymer and the alkoxysilane with which it is reacted is of the following formula:

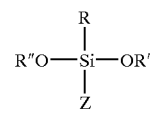

wherein R is a cycloalkyl or an aryl group of 6 to 12 carbon atoms, R' and R" are each independently an alkyl group of from 1 to 10 carbon atoms, and Z is an alkyl or alkoxy group of 1 to 10 carbon atoms.

14. The process of claim 13 wherein R is a phenyl group, R' and R" are each methyl groups, and Z is a methyl or methoxy group.

* * * * *